US011130677B2

(12) United States Patent
Xiong et al.

(10) Patent No.: US 11,130,677 B2
(45) Date of Patent: Sep. 28, 2021

(54) LOW RISK CHLORINE DIOXIDE ONSITE GENERATION SYSTEM

(71) Applicant: Ecolab USA Inc., St. Paul, MN (US)

(72) Inventors: Kun Xiong, Naperville, IL (US); Felice DiMascio, Simsbury, CT (US); Nicholas Ryan Denny, Glen Ellyn, IL (US); Shawn Dalke, Carol Stream, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/928,435

(22) Filed: Mar. 22, 2018

(65) Prior Publication Data
US 2018/0273381 A1 Sep. 27, 2018

Related U.S. Application Data

(60) Provisional application No. 62/476,463, filed on Mar. 24, 2017, provisional application No. 62/585,316, filed on Nov. 13, 2017.

(51) Int. Cl.
*C01B 11/02* (2006.01)
*B01J 14/00* (2006.01)

(52) U.S. Cl.
CPC .......... *C01B 11/024* (2013.01); *B01J 14/00* (2013.01); *C01B 11/026* (2013.01)

(58) Field of Classification Search
CPC ....... C01B 11/024; C01B 11/026; B01J 14/00
See application file for complete search history.

(56) References Cited

U.S. PATENT DOCUMENTS

| 2,614,645 | A | 10/1952 | Wilhelm |
| 2,833,624 | A | 5/1958 | Sprauer |
| 2,971,896 | A | 2/1961 | Curl |
| 3,502,443 | A | 3/1970 | Westerlund |
| 4,250,144 | A | 2/1981 | Ratigan |
| 4,590,057 | A | 5/1986 | Hicks |

(Continued)

FOREIGN PATENT DOCUMENTS

| CA | 2539984 A1 | 9/2005 |
| CN | 1488571 | 4/2004 |

(Continued)

OTHER PUBLICATIONS

DuPont™ Oxone® Monopersulfate Compound (K20101), The Right Choice for Oxidation, 3 pages (2008).

(Continued)

*Primary Examiner* — Ngoc-Yen Nguyen
(74) *Attorney, Agent, or Firm* — Eric D. Babych; Barnes & Thornburg LLP (57) ABSTRACT

The present disclosure generally relates to producing chloride dioxide. A chlorine dioxide reactor, methods for producing chlorine dioxide, and treating aqueous systems are disclosed. The reactor may include a mixing device, a first feed line in fluid communication with the mixing device, and a second feed line in fluid communication with the mixing device. The reactor may include a proximal portion in fluid communication with the mixing device and a distal portion in fluid communication with a motive water line. The mixing device, the reactor, a portion of the first feed line, and a portion of the second feed line may be positioned within the motive water line.

13 Claims, 7 Drawing Sheets

(56) References Cited

U.S. PATENT DOCUMENTS

| | | |
|---|---|---|
| 4,678,655 A | 7/1987 | Twardowski |
| 4,790,943 A | 12/1988 | Dunn et al. |
| 4,886,653 A | 12/1989 | Gasper et al. |
| 5,091,166 A | 2/1992 | Engstrom et al. |
| 5,227,031 A | 7/1993 | Sundblad |
| 5,273,733 A | 12/1993 | Winters et al. |
| 5,366,714 A | 11/1994 | Bigauskas |
| 5,376,350 A | 12/1994 | Tenney et al. |
| 5,380,517 A | 1/1995 | Sokol |
| 5,380,518 A | 1/1995 | Roozdar |
| 5,399,288 A | 3/1995 | Marzouk et al. |
| 5,399,332 A | 3/1995 | Pu |
| 5,813,998 A | 9/1998 | Dias |
| 5,855,861 A | 1/1999 | Lee |
| 5,858,322 A | 1/1999 | Gray |
| 5,863,584 A | 1/1999 | Thomas, Jr. et al. |
| 5,895,638 A | 4/1999 | Tenney |
| 5,906,943 A | 5/1999 | Skorpik et al. |
| 5,968,454 A | 10/1999 | Deacon et al. |
| 6,385,558 B1 | 5/2002 | Schlemm |
| 6,387,344 B1 | 5/2002 | Tenney et al. |
| 6,428,696 B2 | 8/2002 | Küke |
| 6,468,479 B1 | 10/2002 | Mason et al. |
| 6,790,427 B2 | 9/2004 | Charles et al. |
| 6,840,251 B2 | 1/2005 | Gill et al. |
| 7,322,243 B2 | 1/2008 | Liu et al. |
| 7,407,642 B2 | 8/2008 | Mussari et al. |
| 7,452,511 B2 | 11/2008 | Schmitz et al. |
| 7,498,720 B2 | 3/2009 | Loebl et al. |
| 7,507,317 B2 | 3/2009 | Babchin et al. |
| 7,998,538 B2 | 8/2011 | Greengard et al. |
| 8,168,153 B2 | 5/2012 | Sokol et al. |
| 8,318,476 B2 | 11/2012 | Parker et al. |
| 8,486,276 B2 | 7/2013 | Duve |
| 8,647,598 B2 | 2/2014 | Grimland et al. |
| 8,691,154 B2 | 4/2014 | Sperry et al. |
| 8,784,733 B2 | 7/2014 | Alarid et al. |
| 9,061,927 B2 | 6/2015 | Belluati et al. |
| 9,238,587 B2 | 1/2016 | Mason |
| 9,743,670 B2 | 8/2017 | Grund |
| 10,105,389 B1* | 10/2018 | Alliger ............... A61K 45/06 |
| 2002/0014463 A1* | 2/2002 | Iverson ............... C02F 1/50 |
| | | 210/749 |
| 2003/0031621 A1 | 2/2003 | Gravitt et al. |
| 2003/0091497 A1 | 5/2003 | Mason et al. |
| 2003/0200997 A1 | 10/2003 | Gill et al. |
| 2004/0175322 A1 | 9/2004 | Woodruff et al. |
| 2005/0186131 A1 | 8/2005 | Charles et al. |
| 2005/0244328 A1 | 11/2005 | Schmitz et al. |
| 2006/0021872 A1 | 2/2006 | O'Leary et al. |
| 2006/0039840 A1* | 2/2006 | Chia ............... B01J 7/02 |
| | | 422/305 |
| 2006/0051285 A1 | 3/2006 | Hawker et al. |
| 2006/0133983 A1 | 6/2006 | Charles et al. |
| 2007/0116637 A1 | 5/2007 | Woodruff et al. |
| 2007/0237708 A1 | 10/2007 | Woodruff et al. |
| 2009/0159538 A1 | 6/2009 | Duve |
| 2010/0155341 A1 | 6/2010 | Duve |
| 2010/0209332 A1* | 8/2010 | Hratko ............... A61P 1/02 |
| | | 423/477 |
| 2011/0182800 A1 | 7/2011 | Hultén et al. |
| 2011/0262342 A1 | 10/2011 | Richardson et al. |
| 2012/0183469 A1 | 7/2012 | Mussari |
| 2012/0294794 A1 | 11/2012 | Pelin |
| 2012/0305494 A1 | 12/2012 | DiMascio |
| 2013/0015113 A1 | 1/2013 | Mussari |
| 2013/0106003 A1 | 5/2013 | Duve |
| 2013/0209349 A1 | 8/2013 | Vilhelmsson et al. |
| 2014/0138325 A1 | 5/2014 | Tomsheck |
| 2014/0299552 A1 | 10/2014 | Stewart et al. |
| 2014/0302176 A1 | 10/2014 | Grund et al. |
| 2014/0305881 A1 | 10/2014 | Alarid et al. |
| 2015/0021276 A1 | 1/2015 | Rahkola et al. |
| 2015/0083963 A1* | 3/2015 | Thangaraj ............. C01B 11/024 |
| | | 252/183.13 |
| 2016/0029639 A1 | 2/2016 | DiMascio et al. |
| 2017/0064949 A1* | 3/2017 | Kraus ............... C07C 407/00 |

FOREIGN PATENT DOCUMENTS

| | | |
|---|---|---|
| CN | 2654587 Y | 11/2004 |
| CN | 2700312 Y | 5/2005 |
| CN | 100405027 C | 7/2008 |
| CN | 202880867 U | 4/2013 |
| CN | 105752931 A | 7/2016 |
| CN | 205472644 U | 8/2016 |
| DE | 102008042424 A1 | 6/2009 |
| DE | 102010027840 A1 | 10/2011 |
| EP | 0119686 | 9/1984 |
| EP | 0850875 A1 | 7/1998 |
| EP | 2581340 A1 | 4/2013 |
| FR | 2949908 A1 | 3/2011 |
| GB | 1056790 | 1/1967 |
| JP | H03-83802 | 4/1991 |
| WO | WO 2001/077012 A1 | 10/2001 |
| WO | WO 2003/000586 A1 | 1/2003 |
| WO | WO 2006/062455 A1 | 6/2006 |
| WO | WO 2008/058206 A2 | 5/2008 |
| WO | WO 2008/125075 A1 | 10/2008 |
| WO | WO 2016/0140772 A1 | 9/2016 |
| WO | WO 2016/145487 A1 | 9/2016 |

OTHER PUBLICATIONS

DuPont™ Oxone® Monopersulfate Compound (k20102), General Technical Attributes, 4 pages (2008).

International Search Report and Written Opinion of International Application No. PCT/US2018/019660, 10 pages (dated May 16, 2018).

International Search Report and Written Opinion of International Application No. PCT/US2018/023784, 13 pages (dated Jul. 6, 2018).

International Search Report and Written Opinion of International Application No. PCT/US2018/023798, 12 pages (dated Jul. 6, 2018).

Katz, J., "Ozone and Chlorine Dioxide Technology for Disinfection of Drinking Water," Pollution Technology Review, No. 67, 669 Pages; ISBN-10: 0815508026; ISBN-13: 978-0815508021 (1980).

Wastewater Disinfection-MOP FD-10, Water Environment Federation, Alexandria, VA; Report number: MFD10GT, 300p; Accession No. WEF0009 (1996).

Yin, G., et al., "Addition of H2O2 to a methanol based ClO2 generator to decrease Cl2 emission: Mills trials resulted in a 60% reduction in chlorine emissions from stack gases," *Pulp & Paper Canada*, 104(5):62-64 (2003), Abstract only.

Zhang, Jiku., et al., "Study of manufacturing high pure chlorine dioxide with multi-stage compound chlorine dioxide generator," *Advanced Materials Research*, 550-553:3125-3130 (2012), Abstract only.

Detsch, Richard M. et al. "Sound amplification from controlled excitation reactions: Experimental observations in chemically reacting H2/Cl2 mixtures," Journal of the Acoustical Society of America (Feb. 1985), 77(2), pp. 512-519.

Smith, James A. "Using the sounds of nuclear power," Journal of the Acoustical Society of America (2016), 139, p. 2159. (English Abstract only.).

* cited by examiner

LOW RISK CHLORINE DIOXIDE ONSITE GENERATION SYSTEM

BACKGROUND

1. Field of the Invention

The present disclosure generally relates to producing chlorine dioxide. More particularly, the disclosure relates to a chlorine dioxide reactor and methods of producing chlorine dioxide and treating aqueous systems.

2. Description of the Related Art

With the decline of gaseous chlorine as a microbiocide, various alternatives have been explored; including bleach, bleach with bromide, bromo-chloro dimethylhydantoin, ozone, and chlorine dioxide ($ClO_2$). Of these, chlorine dioxide has generated a great deal of interest for control of microbiological growth in a number of different industries, including the dairy industry, the beverage industry, the pulp and paper industry, the fruit and vegetable processing industries, various canning plants, the poultry industry, the beef processing industry and miscellaneous other food processing applications. Chlorine dioxide is also seeing increased use in municipal potable water treatment facilities and in industrial waste treatment facilities, because of its selectivity towards specific environmentally-objectionable waste materials, including phenols, sulfides, cyanides, thiosulfates, and mercaptans. In addition, chlorine dioxide is being used in the oil and gas industry for downhole applications as a well stimulation enhancement additive.

Unlike chlorine, chlorine dioxide remains a gas when dissolved in aqueous solutions and does not ionize to form weak acids. This property is at least partly responsible for the biocidal effectiveness of chlorine dioxide over a wide pH range. Moreover, chlorine dioxide is a highly effective microbiocide at concentrations as low as 0.1 parts per million (ppm) over a wide pH range.

The biocidal activity of chlorine dioxide is believed to be due to its ability to penetrate bacterial cell walls and react with essential amino acids within the cell cytoplasm to disrupt cell metabolism. This mechanism is more efficient than other oxidizers that "burn" on contact and is highly effective against *Legionella*, algae and amoebal cysts, giardia cysts, coliforms, *Salmonella, Shigella*, and *Cryptosporidium*.

Unfortunately, chlorine dioxide in solution is unstable with an extremely short shelf life and thus, is not commercially available. Chlorine dioxide solutions must typically be generated at its point of use such as, for example, by a reaction between a metal chlorate or metal chlorite in aqueous solution and a liquid phase strong acid. However, the use of liquid phase strong acids poses handling issues and safety concerns.

Production of chlorine dioxide using chlorate, hydrogen peroxide, and acid generates heat and may result in inadvertent explosive decomposition of chlorine dioxide if the temperature is not properly controlled.

BRIEF SUMMARY

In some embodiments, a method of producing chlorine dioxide is disclosed. The method may include feeding a first solution comprising an acid through a first feed line into a mixing device; feeding a second solution comprising chlorite through a second feed line into the mixing device; mixing the first solution and the second solution in the mixing device to form a reaction mixture; feeding the reaction mixture into the reactor; reacting the acid and the chlorite in the reactor, wherein the reactor comprises a proximal portion in fluid communication with the mixing device and a distal portion in fluid communication with a motive water line; and mixing chlorine dioxide with motive water in the motive water line at the distal portion of the reactor. The mixing device is in fluid communication with a reactor, and the mixing device, the reactor, a portion of the first feed line, and a portion of the second feed line are positioned within the motive water line.

In some embodiments, the acid is hydrochloric acid, phosphoric acid, sulfuric acid, hypochlorous acid, or any combination thereof.

In other embodiments, a method of producing chlorine dioxide is disclosed. The method may include feeding a first solution comprising an acid through a first feed line into a mixing device; feeding a second solution comprising chlorate and hydrogen peroxide through a second feed line into the mixing device; mixing the first solution and the second solution in the mixing device to form a reaction mixture, wherein the mixing device is in fluid communication with a reactor; feeding the reaction mixture into the reactor; reacting the acid, the chlorate, and the hydrogen peroxide in the reactor, wherein the reactor comprises a proximal portion in fluid communication with the mixing device and a distal portion in fluid communication with a motive water line, wherein the mixing device, the reactor, a portion of the first feed line, and a portion of the second feed line are positioned within the motive water line; and mixing chlorine dioxide with motive water in the motive water line at the distal portion of the reactor.

In some embodiments, the acid is sulfuric acid.

In other embodiments, a method of treating process water is disclosed. The method may include producing chlorine dioxide as described herein and injecting the chlorine dioxide and the motive water into the process water.

In some embodiments, the motive water line includes at least two longitudinal channels through which motive water may flow.

In some embodiments, the reaction mixture has a residence time in the reactor of at least about 0.1 minute, and a precursor velocity is at least about 25 cm/min, wherein the precursor velocity is a velocity of the first and second solutions.

In some embodiments, the methods described herein may include cooling the mixing device and the reactor with the motive water.

In some embodiments, the methods described herein may include producing the chlorine dioxide at a rate ranging from about 0.001 lb/hour to about 20 lb/hour.

In some embodiments, the methods described herein may include operating the reactor at a temperature ranging from about 2° C. to about 80° C.

In some embodiments, the method may include determining a chlorine dioxide demand in the process water using measurements selected from a chlorine dioxide sensor, an oxidation and reduction potential, a flow meter, a microbiological measurement, and any combination thereof.

In some embodiments, a cooling tower comprises the process water.

In other embodiments, a reactor for producing chlorine dioxide is disclosed. The reactor may include a mixing device; a first feed line in fluid communication with the mixing device; a second feed line in fluid communication with the mixing device; a reactor comprising a proximal portion in fluid communication with the mixing device and a distal portion in fluid communication with a motive water line; wherein the mixing device, the reactor, a portion of the first feed line, and a portion of the second feed line are positioned within the motive water line.

In some embodiments, the reactor includes a coiled configuration having a coil plane angle of about 1 degree to about 60 degrees.

In some embodiments, the first feed line and the second feed line are opposite to and directed against each other.

In some embodiments, the reactor includes at least one contact zone, wherein the contact zone comprises an inner diameter at least two times larger than an inner diameter of the reactor.

In some embodiments, the reactor is operated at a pressure about equal to or greater than atmospheric pressure. Atmospheric pressure includes pressures ranging from about 101.3 kPa to about 33.7 kPa. In some embodiments, the reactor is operated at a pressure of about 101.3 kPa.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

Traditionally, an eductor withdraws the chlorine dioxide solution from the reactor using reduced pressure. Reduced pressure is produced by feeding motive water through the eductor; however, the quality and quantity of the motive water must be carefully controlled to avoid producing varying pressures. Varying pressures can lead to inefficiencies in chlorine dioxide production.

In some embodiments of the present disclosure, a method is disclosed for treating process water. The method may include feeding a first solution comprising an acid through a first feed line into a mixing device and feeding a second solution comprising chlorate and hydrogen peroxide through a second feed line into the mixing device. The first and second solutions may then be mixed in the mixing device to form a reaction mixture. A reactor may be in fluid communication with the mixing device. After mixing, the reaction mixture may be fed into the reactor. The acid, chlorate, and hydrogen peroxide may react in the reactor, thereby producing chlorine dioxide. The reactor may include a proximal portion in fluid communication with the mixing device and a distal portion in fluid communication with a motive water line. The mixing device, the reactor, a portion of the first feed line, and a portion of the second feed line may be positioned within the motive water line. As the reaction mixture exits the reactor, the reaction mixture may mix with motive water in the motive water line at the distal portion of the reactor. The mixed chlorine dioxide and motive water may be injected into the process water.

In some embodiments, the first solution may consist of or comprise sulfuric acid and water, where the sulfuric acid concentration ranges from about 50% by weight to about 98% by weight. The sulfuric acid concentration in the first solution may be about 78%. In some embodiments, the second solution may comprise or consist of chlorate, hydrogen peroxide, and water. The second solution may comprise a concentration of chlorate that is in a range of about 25% by weight to about 60% by weight. The concentration of chlorate in the second solution may be about 40% by weight. The concentration of hydrogen peroxide in the second solution may be in the range of about 2% by weight to about 30% by weight. The concentration of hydrogen peroxide in the second solution may be about 8% by weight. In some embodiments, the acid may be sulfuric acid and the chlorate may be sodium chlorate.

In some embodiments, the first solution may consist of or comprise hydrochloric acid and water, where the hydrochloric acid concentration ranges from about 5% by weight to about 38% by weight. The hydrochloric acid concentration in the first solution may be about 37%. In some embodiments, the second solution may consist of or comprise a chlorite and water. The second solution may have a chlorite concentration that ranges from about 5% by weight to about 60% by weight. The chlorite concentration in the second solution may be about 25% by weight. In some embodiments, the chlorite may be sodium chlorite.

In certain embodiments, at least two feed lines carry precursor chemicals to the mixing device. The precursors may include the first and second solutions. In other embodiments, a third feed line may feed water or other chemicals to the mixing device. In some embodiments, the feed lines to the mixing device may consist of a first feed line and a second feed line.

In other embodiments, the method may further include the step of cooling the mixing device and the reactor with the motive water. The motive water passing through the motive water line may serve to control the temperature of the solutions in the feed lines and the temperature of the reaction mixture.

In some embodiments, the reactor may comprise a coiled configuration, which may further increase mixing and enhance mixing. The reactor having a coiled configuration may include a coil plane angle in a range from about 1 to about 60 degrees. In some embodiments, the coil plane angle may be from about 5 to about 30 degrees. The reactor having a coiled configuration may include a coil diameter. The coil diameter may be in a range from about 0.1 to about 16.0 inches, about 1 inch to about 16 inches, about 2 inch to about 16 inches, about 2 inch to about 10 inches, or about 2 inches to about 4 inches.

In some embodiments, the motive water line may comprise at least two channels. The channels may be longitudinal. In some embodiments, the motive water line may be a double containment pipe. The motive water line may have an inner channel and an outer channel through which motive water may flow, and the reactor may be positioned within the inner channel. The motive water flow rate in the outer channel may be different than the flow rate of the motive water in the inner channel. The motive water flow rate in the inner channel may be such that the temperature of the reaction mixture is controlled within a certain range. The reaction mixture temperature may be about 2° C. to about 80° C., about 2° C. to about 70° C., about 35° C. to about 70° C., about 40° C. to about 70° C., or about 50° C. to about 70° C. The reaction mixture temperature may be about 60° C. The temperature of the motive water in the outer channel may be different from the temperature of the motive water in the inner channel. The outer channel may contain motive water having a flow rate sufficient to dilute the chlorine dioxide to a safe concentration such as less than about 3,000 ppm, less than about 2,000 ppm, less than about 1,500 ppm, less than about 1,000, less than about 750 ppm, less than about 500 ppm, less than about 250 ppm, less than about 100 ppm, or less than about 50 ppm.

In some embodiments, the first feed line and the second feed line may be opposite to and directed against each other. In this configuration, the solutions fed through the first and second feed lines may collide and mix.

In some embodiments, the reactor may include at least one contact zone. In some embodiments, the reactor may include at least two, three, four, or more contact zones. In other embodiments, the contact zone may comprise an inner diameter at least about two times larger than an inner diameter of the reactor. In some embodiments, the contact zone may comprise an inner diameter at least about three, four, or five times larger than an inner diameter of the reactor.

In some embodiments, the acid, the chlorate, and the hydrogen peroxide may form a reaction mixture in the mixing device. The first and second solutions may combine to form the reaction mixture. At least one advantage of using a solution of chlorate and hydrogen peroxide to react with an acid solution is that no chlorine gas is produced. The absence of chlorine gas provides a more safe and economical process.

In certain embodiments, the reaction mixture may have a residence time in the reactor of at least about 0.1 minute. In some embodiments, the reaction mixture may have a residence time in the reactor of at least about 1 minute. In other embodiments, the reaction mixture may reside in the reactor for at least about 3 minutes, at least about 4 minutes, at least about 5 minutes, at least about 6 minutes, at least about 7 minutes, at least about 8 minutes, at least about 9 minutes, or at least about 10 minutes. In some embodiments, the reaction mixture may have a residence time in the reactor of about 3.8 minutes. Residence time may be calculated by dividing total reactor volume by total precursor flow rate.

In some embodiments, the precursors (acid and chlorate/hydrogen peroxide or chlorite) may be fed into the mixing device at a flow velocity of about 25 cm/minute. In some embodiments, the precursors may be fed into the mixing device at a flow velocity in a range from about 20 cm/minute to about 200 cm/minute, about 20 cm/minute to about 65 cm/minute, or about 20 cm/minute to about 50 cm/minute. In some embodiments the precursor velocity may be about 25 cm/minute, about 50 cm/minute, or about 65 cm/min. Precursor velocity can be calculated by dividing total precursor flow rate by the cross-sectional area of the reactor.

In other embodiments, the reactor may be operated at a pressure about equal to or greater than atmospheric pressure.

In some embodiments, the method may include withdrawing chlorine dioxide using an eductor. In some embodiments, the methods disclosed do not use an eductor to withdraw chlorine dioxide from the reactor. In some embodiments, the reactor does not comprise an educator.

In some embodiments, the method may include operating the reactor at a temperature in a range from about 2° C. to about 80° C. In some embodiments, the method may include operating the reactor at a temperature of about 60° C.

In some embodiments, the temperature of the motive water may be in a range from about 2° C. to about 80° C. The motive water temperature may be in range from about 15° C. to about 70° C., about 30° C. to about 70° C., about 40° C. to about 70° C., about 40° C. to about 60° C., or about 50° C. to about 70° C.

In some embodiments, the method may include determining a chlorine dioxide demand in the process water using measurements from a sensor, such as a chlorine dioxide sensor, an oxidation and reduction potential, a flow meter, a microbiological measurement, or any combination thereof. In some embodiments, the chlorine dioxide may be added to the process water in a cooling tower.

In some embodiments, the chlorine dioxide may be added to an aqueous system. The present disclosure is not limited to adding chlorine dioxide to process water in cooling towers.

In some embodiments, the method may include a process control system including a Programmable Logic Controller (PLC), a chlorine dioxide analyzer, a pressure transmitter (PT) and a flow transmitter (FT), controls the feed pumps for the chemicals to the reactor and for the motive water.

In some embodiments, the method may include a distribution system. The distribution system may include at least two independently controlled dosing points. The distribution system may include, for example, 3, 4, 5, 6, 7, or 8 independently controlled dosing points. When the different $ClO_2$ production set points are entered into the controller, the PLC automatically calculates and adjusts the required production of the chlorine dioxide reactor. A distribution system may allow chlorine dioxide solution to be distributed to multiple points directly from the discharge chlorine dioxide reactor, thus avoiding a storage tank system. The distribution system may incorporate a $ClO_2$ solution pump and flowmeters and control valves to manage the distribution among various dosing points.

The flow meters that may be used with the disclosed methods may be any suitable flow meter, such as but not limited to clamp-on or pulse flow meters. Pulse-based flow meters detect the kinetic energy of flowing fluid using optical or magnetic sensors and converting it into electrical energy in the form of digital pulses. The flow rate can be determined by measuring the periods of the pulses.

The pumps used to feed the first and second solutions may be in communication with the PLC. The PLC may also be in communication with any pumps placed on a product feed line.

In some embodiments, the reactor may be in fluid communication with at least one product feed line. Pumps may be placed on each one of the product feed lines, or in some embodiments, multiple product feed lines may share a single pump.

In some embodiments, any of the methods disclosed herein may include determining a flow rate of the first solution in the first feed line, a flow rate of the second solution in the second feed line, a flow rate of a chlorine dioxide solution in a product feed line, or a flow rate of the motive water in the motive water line.

In some embodiments, the flow rate of any solutions being fed into the reactor may be determined using at least two flow meters that determine the flow rate based on different principles to ensure that an accurate amount of precursor chemical is being fed into the reactor.

In some embodiments, any of the methods disclosed herein may include sensing a reactor pressure. In some embodiments, the product feed lines may be equipped with a check valve, flow meter, and feed pump.

In certain embodiments, any of the methods disclosed herein may include calculating a chlorine dioxide dose. The chlorine dioxide dose may be calculated using the flow rates of the, first solution, second solution, motive water, chlorine dioxide solution in the product feed lines, and the chlorine dioxide concentration. For example, the chlorine dioxide concentration in the main line can be calculated using the formula: Main Line Product Rate=$(F_p+F_a+F_w-F_{productline})$ *$C_{ClO2}$ where $F_p$ is the flow rate of hydrogen peroxide and chlorate, $F_a$ is the flow rate of the acid, $F_w$ is the flow rate of the motive water, $F_{productline}$ is the sum of flow rates in any product feed lines connected to the main line, and $C_{ClO2}$ is the concentration of chlorine dioxide.

Multiple alarms and failsafe settings may be set using the PLC. For example, pump issues may be detected by monitoring the differential between the flow meter readings and the pump rate calculations. Some failsafes may include pressure relief valves on the reactor or product feed lines. Any of the feed lines may have a pressure sensor that communicates readings to the main control device. By way of example, the main control device may include a PLC and an Adam AI/AO (analog input/analog output) module. If the reactor is housed in a cabinet, then the cabinet may have leak detection sensors and a cabinet door lock.

In other embodiments of the present disclosure, a method for producing chlorine dioxide is provided. The method may include feeding a first solution comprising an acid through a first feed line into a mixing device and feeding a second solution comprising chlorate and hydrogen peroxide through a second feed line into the mixing device. The method may include mixing the first solution and the second solution in the mixing device. The mixing device may be connected to a reactor. After mixing, the first solution and the second solution may be fed into the reactor where the acid, the chlorate, and the hydrogen peroxide react to form chlorine dioxide. The reactor may include a proximal portion in fluid communication with the mixing device and a distal portion in fluid communication with a motive water line. The mixing device, the reactor, a portion of the first feed line, and a portion of the second feed line may be positioned within the motive water line. The method may include mixing the chlorine dioxide with motive water in the motive water line at the distal portion of the reactor.

In other embodiments, a method of producing chlorine dioxide is provided. The method may include feeding a first solution, such as an acid, through a first feed line into a mixing device. A second solution, such as chlorite, may be fed through a second feed line into the mixing device. The mixing device may be in fluid communication with a reactor. The method includes mixing the first solution and the second solution in the mixing device to form a reaction mixture. The reaction mixture may be fed into the reactor where the acid and the chlorite react. The reactor includes a proximal portion in fluid communication with the mixing device and a distal portion in fluid communication with a motive water line. The mixing device, the reactor, a portion of the first feed line, and a portion of the second feed line are positioned within the motive water line. The method includes mixing chlorine dioxide with motive water in the motive water line at the distal portion of the reactor. In some embodiments, the acid may be hydrochloric acid, phosphoric acid, sulfuric acid, hypochlorous acid, or any combination thereof. In some embodiments, the acid may be hydrochloric acid.

In other embodiments of the present disclosure, a reactor for producing chlorine dioxide is provided. The reactor may include a mixing device, a first feed line in fluid communication with the mixing device, and a second feed line in fluid communication with the mixing device. The reactor may include a proximal portion in fluid communication with the mixing device and a distal portion in fluid communication with a motive water line. The mixing device, the reactor, a portion of the first feed line, and a portion of the second feed line may be positioned within the motive water line.

In some embodiments, the diameter of the motive water line may be larger than the diameter of the reactor and the first and second feed lines such that the reactor and the feed lines may be positioned in the lumen of the motive water line.

Figure 4:
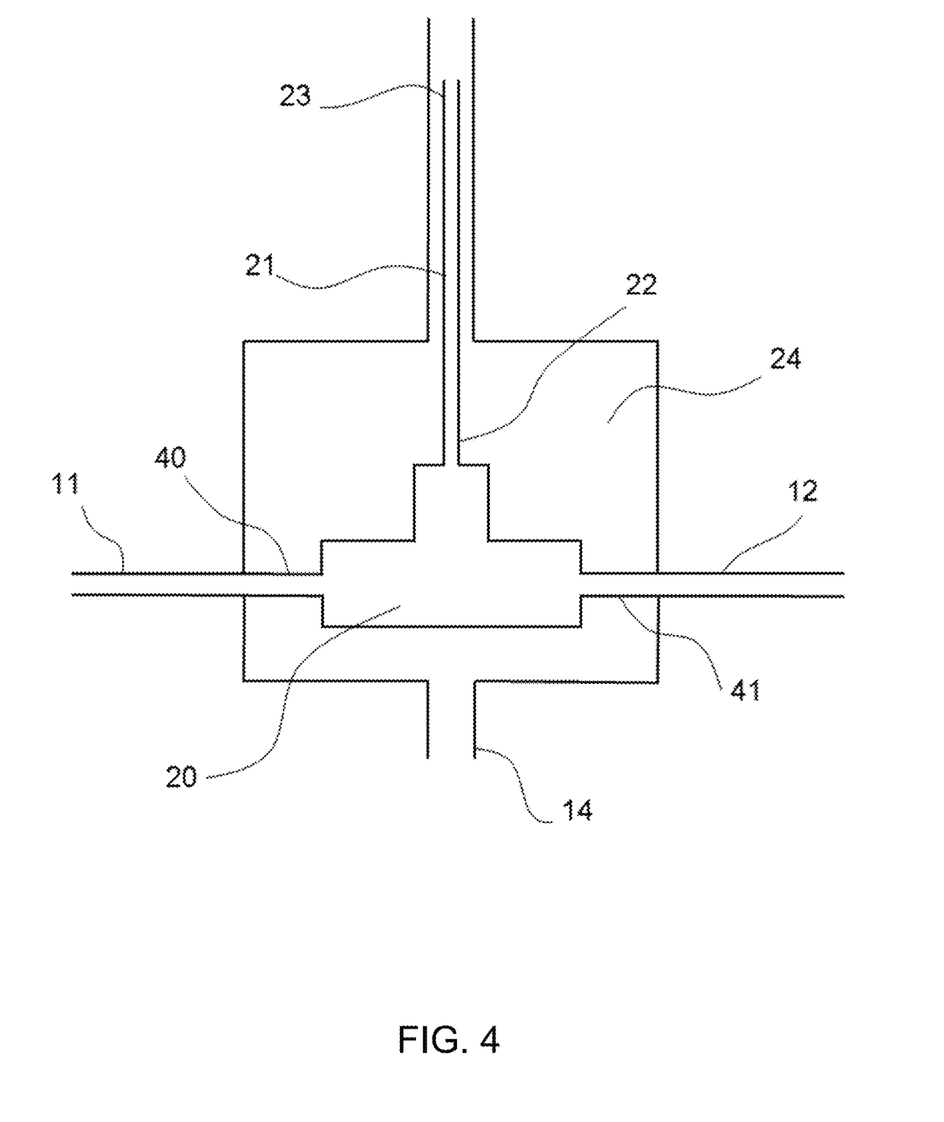
FIG. 4 shows a cross-sectional view of an embodiment of a chlorine dioxide mixer and reactor.

In some embodiments, the first feed line and the second feed line may be opposite to and directed against each other as in a "T" configuration, see, for example, the orientation of components corresponding to reference numerals 11 and 12 in FIG. 4.

In certain embodiments, the reactor may include at least one contact zone. The contact zone may include an inner diameter at least two times larger than an inner diameter of the reactor. As the reaction mixture flows through the reactor it may reach a contact zone where the reaction mixture may further mix. The outlet of the contact zone may narrow to the diameter of the reactor.

In some embodiments, the reactor may have a length in a range from about 25 inches to about 300 inches. In some embodiments, the reactor may have a length in a range from about 30 inches to about 90 inches, about 30 inches to about 80 inches, about 30 inches to about 70 inches, about 30 inches to about 60 inches, about 30 inches to about 50 inches, about 40 inches to about 90 inches, about 40 inches to about 80 inches, about 35 inches to about 45 inches, or about 35 inches to about 60 inches. In other embodiments, the reactor may be about 40 inches in length.

The reactor may be positioned horizontally, vertically, or any angle in between. In some embodiments, the reactor may be positioned vertically. In embodiments where the reactor is a coiled reactor, the reactor may spiral upward.

In some embodiments, the reactor may have an inner diameter in a range from about 0.1 inches to about 4 inches. In some embodiments, the reactor may have an inner diameter in a range from about 1 inch to about 1.25 inches, or about 0.25 inches to about 1.25 inches. In some embodiments, the reactor may have an inner diameter of about 0.25 inches, about 2 inches, about 3 inches, or about 4 inches. In other embodiments, the reactor may have an inner diameter of about 1.25 inches, about 1 inch, about 0.75 inches, about 0.375 inches, or about 0.1875 inches.

In some embodiments, the chlorine dioxide may be produced at a rate in a range from about 0.001 lb/hour to about 20 lb/hour. In some embodiments, the chlorine dioxide may be produced at a rate in a range from about 0.02 lb/hour to about 15 lb/hour. In some embodiments, the chlorine dioxide may be produced at a rate in a range from about 5 lb/hour to about 15 lb/hour. As chlorine dioxide is produced at a higher rate, a larger diameter reactor may be used to ensure that the residence time in the reactor is at least about 3 minutes. In some embodiments, the residence time in the reactor may be at least about 2 minutes.

Figure 1:
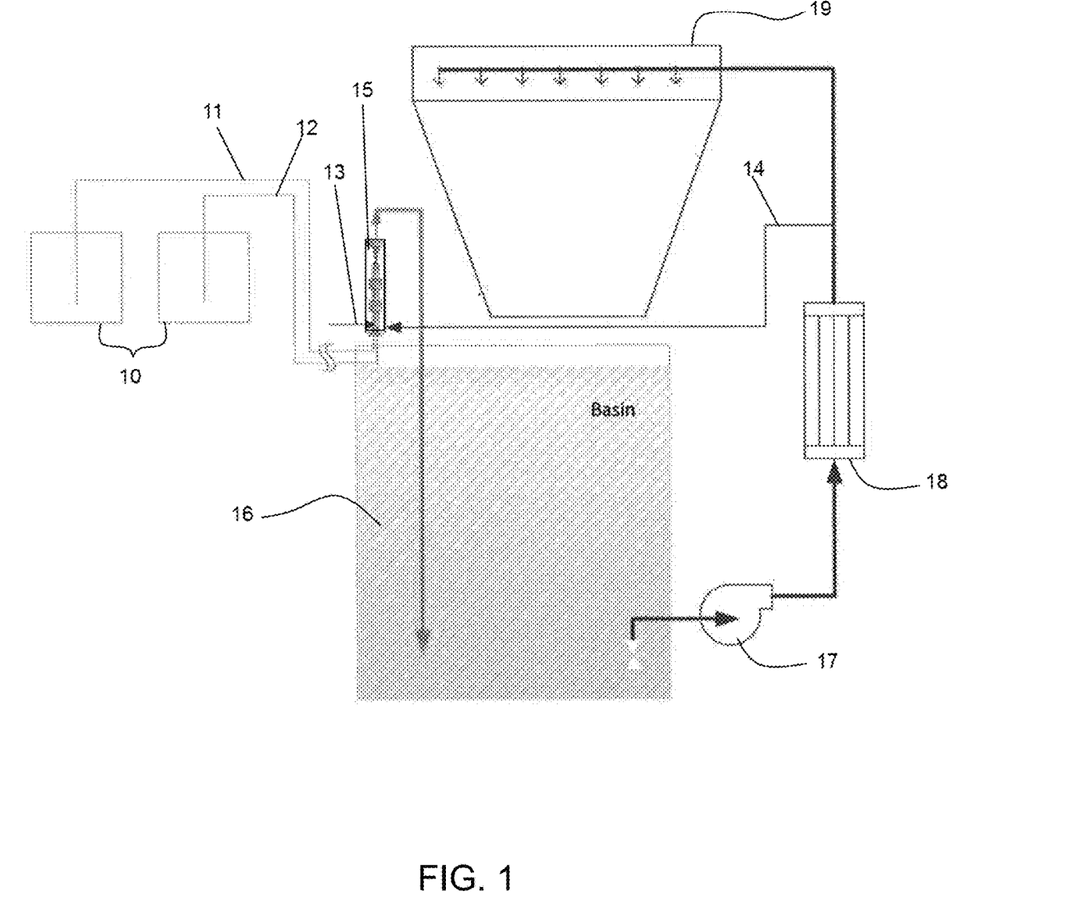
FIG. 1 shows a conceptual diagram of an embodiment of a method of treating cooling tower water by generating chlorine dioxide onsite.

Referring to the figures, FIG. 1 shows a conceptual diagram of certain embodiments for a method of treating cooling tower water onsite. Precursor chemicals may be stored in a tank 10 onsite from which the chemicals may be fed through the first feed line 11 and the second feed line 12 into a chlorine dioxide mixer and reactor 15. Water may be fed into the mixer to dilute the precursor chemicals being fed into the chlorine dioxide mixer and reactor 15. Water may be fed into the mixer and reactor 15 through a motive feed line 14. A water line 13 may supply water to the motive water line 14 and/or it may supply water to dilute acid before or after entering the mixer. Chlorine dioxide may be injected into process water 16 that may be fed into a cooling tower 19. A pump 17 may feed the process water 16 through a heat exchanger 18.

Figure 2:
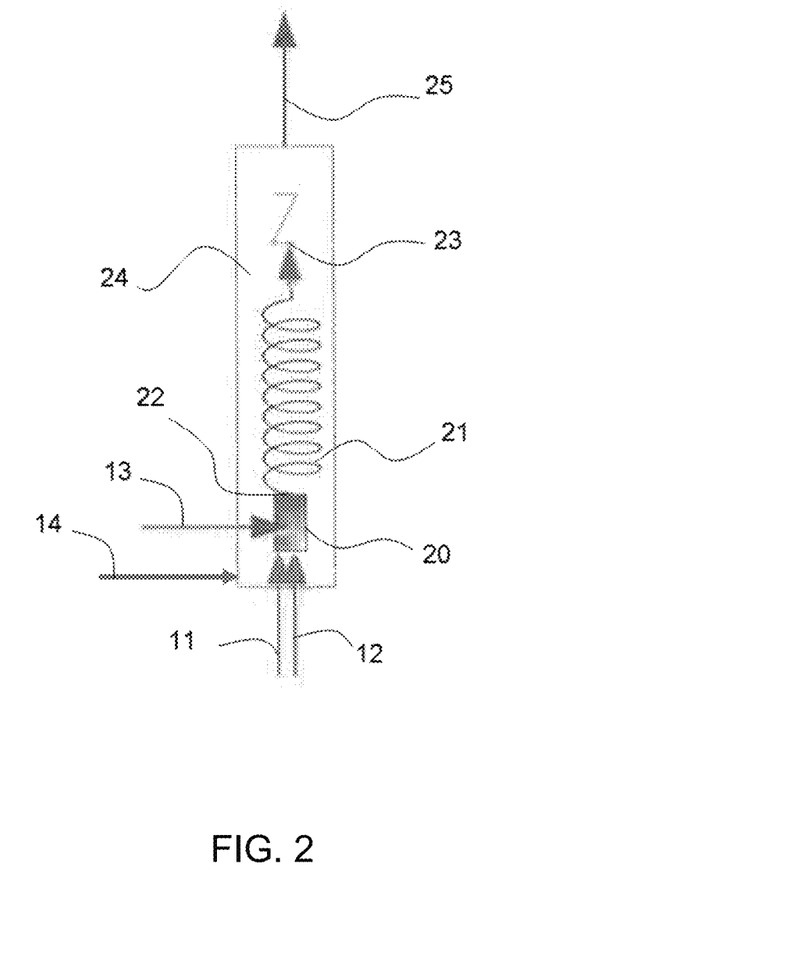
FIG. 2 shows an embodiment of a chlorine dioxide mixer and reactor.
Figure 3:
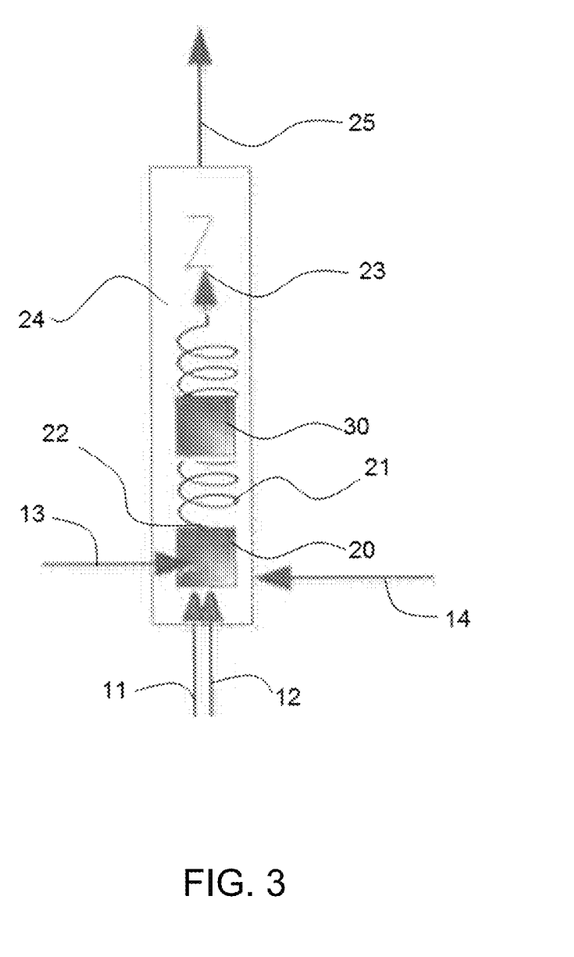
FIG. 3 shows an embodiment of a chlorine dioxide mixer and reactor.

FIG. 2 and FIG. 3 show a closer view of some embodiments of the chlorine dioxide mixer and reactor 15. The first feed line 11 and the second feed line 12 may introduce precursor chemicals into the mixing device 20. In some embodiments, a water line 13 may feed water into the mixing device 20. A motive feed line 14 may supply water to the motive water line 24. In some embodiments, the water in the motive water line 24 may cool the reactor 21. In other embodiments, the water in the motive water line 24 dilutes and mixes with the chlorine dioxide at the distal portion of the reactor 23. The proximal portion of the reactor 22 may be connected to the mixing device 20. Fluid in the mixing device 20 may flow out of the mixing device 20 and into the reactor 21. In some embodiments, the reactor 21 may be in a coiled configuration. In some embodiments, a chlorine dioxide feed line 25 carries the chlorine dioxide mixed with motive water to the process water. Some embodiments may include at least one contact zone 30 (see FIG. 3, for example). The contact zone 30 may allow increased mixing of the reaction mixture or increased residence time in the reactor in order to increase reaction efficiency.

FIG. 4 shows an embodiment where the first feed line 11 and the second feed line 12 are opposite to and directed against each other. The solutions mix in the mixing device 20 and then enter the proximal portion of the reactor 22. The reaction mixture may continue to flow through the reactor 21, exit the distal portion of the reactor 23, and mix with the motive water in the motive water line 24. Water may be fed into the motive water line 24 from the motive feed line 14. In some embodiments, the mixing device 20, the reactor 21, a portion of the first feed line 40, and a portion of the second feed line 41 are positioned within the motive water line 24.

Figure 5:
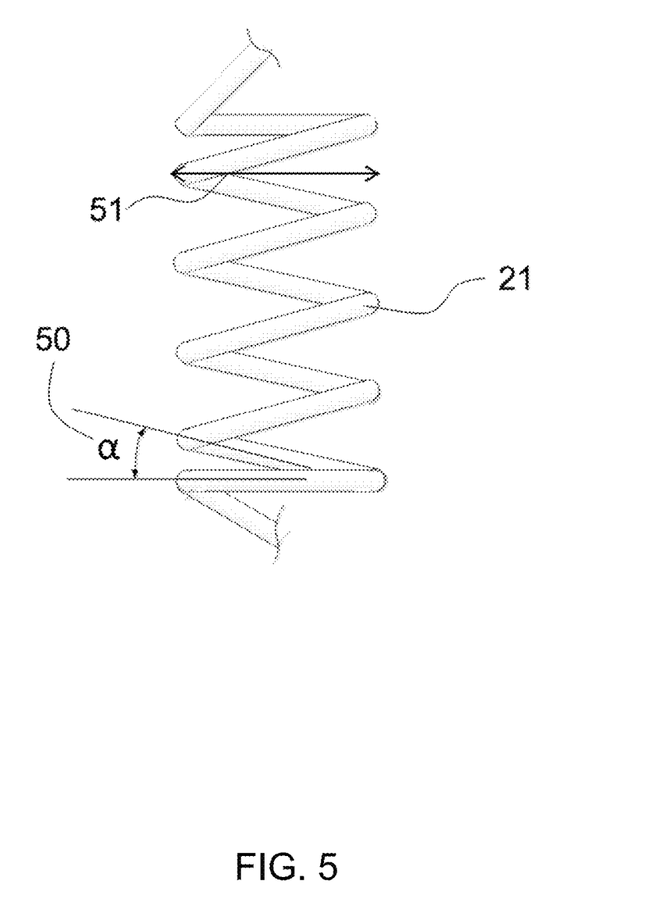
FIG. 5 shows an embodiment of a coiled reactor.

FIG. 5 shows an embodiment where the reactor 21 may comprise a coiled configuration. The reactor having a coiled configuration may include a coil plane angle 50 ranging from about 5 to about 30 degrees. The reactor having a coiled configuration may include a coil diameter 51. The coil diameter may range from about 0.1 inch to about 4.0 inches. The inner diameter of the coil reactor may be as described above for the reactor.

Figure 6:
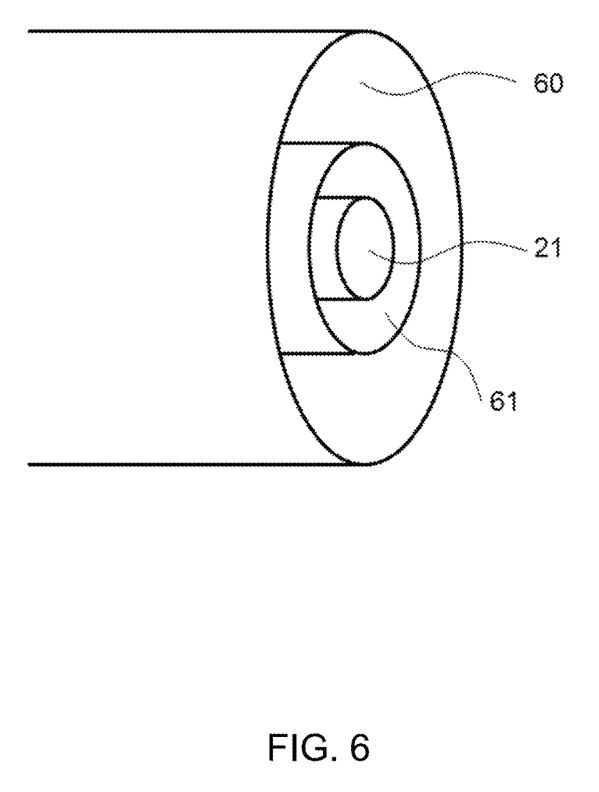
FIG. 6 shows a cross-sectional view of an embodiment of the motive water line and the reactor.

FIG. 6 show an embodiment where the motive water line comprises an outer channel 60 and an inner channel 61. The reactor 21 may be disposed within the lumen of the inner channel 61. In this configuration, the motive water may be fed into the motive water line via two separate channels. The outer channel 60 and inner channel 61 may carry motive water at difference flow rates. The motive water in the outer channel 60 may have a different temperature than the motive water in the inner channel 61.

Figure 7:
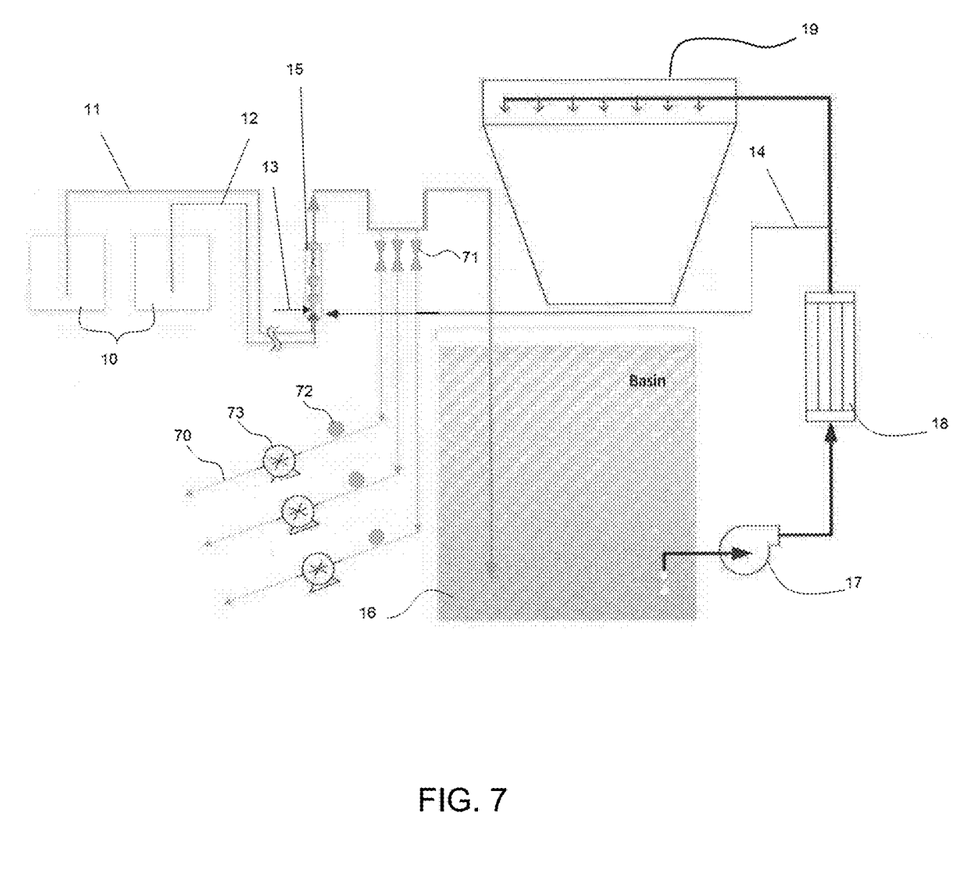
FIG. 7 shows a conceptual diagram of an embodiment of a method of treating cooling tower water and other targets by generating chlorine dioxide onsite.

FIG. 7 shows a conceptual diagram of certain embodiments for a method of treating cooling tower water and multiple targets. Precursor chemicals may be stored in a tank 10 onsite from which the chemicals may be fed through the first feed line 11 and the second feed line 12 into a chlorine dioxide mixer and reactor 15. Water may be fed into the mixer via line 13 to dilute the precursor chemicals being fed into the chlorine dioxide mixer and reactor 15. Water may be fed into the mixer and reactor 15 through a motive feed line 14. Chlorine dioxide may be injected into process water 16 that may be fed into a cooling tower 19. A pump 17 may feed the process water 16 through a heat exchanger 18. The chlorine dioxide generated in the reactor 15 can be added to process water 16 or diverted into a product feed line 70 for treating other targets. The product feed line 70 may include a valve 71, a flow meter 72, and a pump 73. All valves and pumps may be controlled using a PLC (not pictured).

EXAMPLES

Example 1

A solution containing about 40% sodium chlorate and about 8% hydrogen peroxide and an aqueous solution of about 78% sulfuric acid were each fed at a rate of about 63 mL/h through 0.25 inch tubing into a 0.25 inch Kynar Union Tee that was inserted inside a polyvinyl chloride cross tube with about a 2 inch inner diameter.

The precursors flowing through the Kynar Union Tee then flowed through about 40 inches of 0.25 inch tubing (8 mL volume) that was inserted inside 0.5 inch tubing. Motive water flowed into the polyvinyl chloride cross tube and out of the 0.5 inch tubing (around the 0.25 inch tubing) to provide cooling and dilution. The reaction tube length and precursor velocity of about 26.5 cm/min provided a residence time of about 3.81 minutes.

Each experiment ran for about 15 minutes, and the chlorine dioxide concentration was measured about every 5 minutes. The motive water served two purposes: dilution and cooling. Water to precursor ratio of about 30 or less was required to establish the heat needed for the reaction. This generated chlorine dioxide concentrations of greater than about 5,500 mg/L.

Flow velocity of the precursors was set at about 26.5 cm/min. Flow velocities may be greater than about 25 cm/min to allow the gaseous oxygen to remain as nano- and micro-bubbles and to accelerate the movement of nano- and micro-bubbles out of the reactor tube.

The concentration of chlorine dioxide was determined using a spectrophotometer. Readings from the spectrophotometer were used to calculate the chlorine dioxide concentration using a calibration curve. The curve was prepared according to Iodometric Method 4500-$ClO_2$ in Standard Methods for the Examinations of Water and Wastewater 20th edition 1998. The amount of solution consisting of about 40% sodium chlorate and about 7.99% hydrogen peroxide required for 100% reaction efficiency was about 2.86 mL to produce about 1 gram of chlorine dioxide. The reaction or conversion efficiency was calculated from the percentage ratio of the total chlorine dioxide generated to the theoretical chlorine dioxide production based on the amount of Purate consumed: $\eta_{current} = (C_{ClO2} \cdot Q_{ClO2})/(Q_{Purate}/2.86)$ where $C_{ClO2}$ is concentration of chlorine dioxide (g/L), $Q_{ClO2}$ flowrate of chlorine dioxide (L/hour), and $Q_{Purate}$ flow rate of Purate (chlorate about 40% and hydrogen peroxide about 7.99% mixture) (mL/hour).

TABLE 1

Reaction efficiency

| | | | | | | | | | |
|---|---|---|---|---|---|---|---|---|---|
| Motive Water (L/h) | 7.50 | 7.50 | 7.50 | 3.76 | 3.76 | 3.76 | 3.14 | 3.14 | 3.14 |
| Purate Flow Rate (mL/h) | 63.0 | 63.0 | 63.0 | 63.0 | 63.0 | 63.0 | 63.0 | 63.0 | 63.0 |
| 78% Sulfuric Acid Flow Rate (mL/h) | 63.0 | 63.0 | 63.0 | 63.0 | 63.0 | 63.0 | 63.0 | 63.0 | 63.0 |
| Residence Time (min) | 3.81 | 3.81 | 3.81 | 3.81 | 3.81 | 3.81 | 3.81 | 3.81 | 3.81 |
| Water:Prec. Ratio | 60 | 60 | 60 | 30 | 30 | 30 | 25 | 25 | 25 |
| Precursor Flow Velocity (cm/m) | 26.5 | 26.5 | 26.5 | 26.5 | 26.5 | 26.5 | 26.5 | 26.5 | 26.5 |
| Chlorine Dioxide Conc. (g/L) | 2.49 | 2.36 | 2.35 | 5.51 | 5.53 | 6.62 | 6.69 | 6.73 | 6.70 |
| Chlorine Dioxide Flow Rate (L/h) | 7.63 | 7.63 | 7.63 | 3.89 | 3.89 | 3.89 | 3.27 | 3.27 | 3.27 |
| Actual Output (g/h) | 18.7 | 17.7 | 17.6 | 21.4 | 21.5 | 21.8 | 21.8 | 22.0 | 21.9 |
| Theoretical Output (g/h) | 22.0 | 22.0 | 22.0 | 22.0 | 22.0 | 22.0 | 22.0 | 22.0 | 22.0 |
| Reaction Efficiency (%) | 84.9 | 80.3 | 79.9 | 97.2 | 97.6 | 99.1 | 99.1 | 99.8 | 99.3 |

Example 2

In this experiment, a ⅜" inch Tee connected to about 91.4 cm of ⅜" inch tubing was used as a mixing device and reactor, respectively. Different residence times (calculated by dividing reactor volume by total reactant flow rate) and motive water temperatures were tested. The conversion rate was calculated as described above. Purate was a mixture of chlorate and hydrogen peroxide as described above.

TABLE 2

Residence time and temperature effects on conversion.

| Residence Time min | Motive Water Temp ° C. | Purate mole/min | $H_2SO_4$ mole/min | $ClO_2$ lb/hr | $H_2SO_4$/Purate mole/mole | Conversion Rate % |
|---|---|---|---|---|---|---|
| 15.6 | 34 | 0.0095 | 0.0250 | 0.085 | 2.64 | 88.4 |
| 15.6 | 37 | 0.0095 | 0.0250 | 0.085 | 2.64 | 93.4 |
| 8.6 | 36 | 0.0172 | 0.0455 | 0.154 | 2.64 | 87.1 |
| 8.6 | 43 | 0.0172 | 0.0455 | 0.154 | 2.64 | 88.1 |
| 8.6 | 53 | 0.0172 | 0.0455 | 0.154 | 2.64 | 99.7 |
| 8.6 | 51 | 0.0172 | 0.0366 | 0.154 | 2.13 | 86.2 |
| 15.6 | 50 | 0.0095 | 0.0250 | 0.085 | 2.64 | 95.9 |
| 7.8 | 51 | 0.0189 | 0.0500 | 0.169 | 2.64 | 99.9 |
| 3.9 | 50 | 0.0379 | 0.1001 | 0.338 | 2.64 | 89.0 |
| 5.2 | 48 | 0.0284 | 0.0751 | 0.254 | 2.64 | 96.0 |

Example 3

A ¼" inch Tee connected to a 12 ml chamber by about 5.72 cm of ¼" inch tubing was used in this experiment. The chamber was also connected to about 26 cm of ¼" tubing. The configuration was similar to the reactor depicted in FIG. 3 where the 12 ml chamber may be a contact zone.

Table 3 shows the effects of motive water and the ratio of $H_2SO_4$/Purate on conversion rate. Table 4 shows the effects of reduced amount of acid at a motive water temperature of about 62° C. and a residence time of about 14 min. The residence time for these trials was fixed at about 14 min.

TABLE 3

Effects of motive water temperature and $H_2SO_4$/Purate on conversion

| Temp ° C. | Purate mole/min | $H_2SO_4$ mole/min | $ClO_2$ lb/hr | $H_2SO_4$/Purate mole/mole | Conversion Rate % |
|---|---|---|---|---|---|
| 16 | 0.0095 | 0.0250 | 0.085 | 2.64 | 64.8 |
| 30 | 0.0095 | 0.0250 | 0.085 | 2.64 | 92.6 |
| 41 | 0.0095 | 0.0250 | 0.085 | 2.64 | 95.1 |
| 53 | 0.0095 | 0.0250 | 0.085 | 2.64 | 94.4 |
| 62 | 0.0095 | 0.0250 | 0.085 | 2.64 | 97.7 |
| 41 | 0.0095 | 0.0205 | 0.085 | 2.16 | 87.8 |
| 47 | 0.0095 | 0.0208 | 0.085 | 2.20 | 95.4 |
| 62 | 0.0095 | 0.0208 | 0.085 | 2.20 | 97.4 |

TABLE 4

Effect of reduced acid at 62° C.

| Temp ° C. | Purate mole/min | $H_2SO_4$ mole/min | $ClO_2$ lb/hr | $H_2SO_4$/Purate mole/mole | Conversion Rate % |
|---|---|---|---|---|---|
| 62 | 0.0095 | 0.0254 | 0.085 | 2.68 | 97.1 |
|  | 0.0095 | 0.0208 | 0.085 | 2.20 | 99.8 |
|  | 0.0095 | 0.0162 | 0.085 | 1.71 | 92.7 |
|  | 0.0095 | 0.0127 | 0.085 | 1.34 | 65.9 |

Table 5 shows the effects of residence time and motive water temperature on conversion rate.

TABLE 5

Effect of residence time and temperature on conversion rate.

| Residence Time min | Temp ° C. | Purate mole/ min | $H_2SO_4$ mole/ min | $ClO_2$ lb/hr | $H_2SO_4$/ Purate mole/ mole | Conversion Rate % |
| --- | --- | --- | --- | --- | --- | --- |
| 3 | 53 | 0.0095 | 0.0159 | 0.085 | 1.68 | 52.7 |
| 14 | 47 | 0.0095 | 0.0162 | 0.085 | 1.71 | 78.9 |
| 14 | 62 | 0.0095 | 0.0162 | 0.085 | 1.71 | 92.7 |
| 17 | 45 | 0.0095 | 0.0159 | 0.085 | 1.68 | 71.7 |
| 17 | 46 | 0.0095 | 0.0162 | 0.085 | 1.71 | 83.7 |
| 17 | 46 | 0.0189 | 0.0324 | 0.170 | 1.71 | 68.5 |
| 17 | 62 | 0.0095 | 0.0162 | 0.085 | 1.71 | 92.1 |

Example 4

In this experiment, a ¼" inch Tee connected to a 12 ml chamber by about 2 feet of ¼" inch tubing was used. The chamber was also connected to about 10 feet of ¼" tubing. The configuration was similar to the reactor depicted in FIG. 3 where the 12 ml chamber may be a contact zone. The volume of the reactor was about 78.2 ml.

TABLE 6

Effect of residence time, motive water temperature, and acid on conversion rate.

| Residence Time min | Temp ° C. | Purate mole/ min | $H_2SO_4$ mole/ min | $ClO_2$ lb/hr | $H_2SO_4$/ Purate mole/ mole | Conversion Rate % |
| --- | --- | --- | --- | --- | --- | --- |
| 21.1 | 31.2 | 0.0095 | 0.0250 | 0.085 | 2.64 | 95.0 |
| 21.1 | 29.3 | 0.0095 | 0.0205 | 0.085 | 2.16 | 90.0 |
| 21.1 | 35.6 | 0.0095 | 0.0205 | 0.085 | 2.16 | 88.5 |
| 21.1 | 37.5 | 0.0095 | 0.0205 | 0.085 | 2.16 | 93.0 |
| 21.1 | 44.1 | 0.0095 | 0.0205 | 0.085 | 2.16 | 99.1 |
| 10.6 | 43.9 | 0.0189 | 0.0409 | 0.169 | 2.16 | 87.6 |
| 10.6 | 43.5 | 0.0189 | 0.0455 | 0.169 | 2.40 | 89.3 |
| 11.6 | 43.3 | 0.0172 | 0.0455 | 0.154 | 2.64 | 97.1 |
| 11.6 | 33.8 | 0.0172 | 0.0455 | 0.154 | 2.64 | 85.7 |

Example 5

Chlorine dioxide production was tested using the reactor disclosed herein and chlorite as a precursor instead of chlorate. A solution of about 25 wt % of chlorite and a solution of about 29 wt % hydrochloric acid was fed to a reactor. The reactor included a ¼" inch Tee (mixing device) connected to a 12 ml chamber by about 5.72 cm of ¼" inch tubing. The chamber was also connected to about 26 cm of ¼" tubing. Table 7 shows the reaction efficiency as a function of time.

TABLE 7

Chlorine dioxide production using chlorite and hydrochloric acid.

| Time (min) | $ClO_2$ (mg/L) | $ClO_2$ Vol. (L/h) | $ClO_2$ Output (g/h) | $NaClO_2$ Rate (L/h) | mL $NaClO_2$/g $ClO_2$ | Rxn. Eff. (%) |
| --- | --- | --- | --- | --- | --- | --- |
| 0 | 162 | 7.59 | 1.23 | 0.013 | 10.25 | 54.5 |
| 2 | 178 | 7.59 | 1.35 | 0.013 | 9.33 | 59.9 |
| 4 | 202 | 7.59 | 1.53 | 0.013 | 8.22 | 68.0 |
| 6 | 214 | 7.59 | 1.62 | 0.013 | 7.76 | 72.1 |
| 8 | 225 | 7.59 | 1.71 | 0.013 | 7.38 | 75.8 |
| 10 | 227 | 7.59 | 1.72 | 0.013 | 7.31 | 76.4 |
| 12 | 229 | 7.59 | 1.74 | 0.013 | 7.25 | 77.1 |
| 14 | 264 | 7.59 | 2.00 | 0.013 | 6.29 | 88.9 |
| 16 | 280 | 7.59 | 2.12 | 0.013 | 5.93 | 94.3 |
| 18 | 282 | 7.59 | 2.14 | 0.013 | 5.89 | 94.9 |
| 20 | 289 | 7.59 | 2.19 | 0.013 | 5.75 | 97.3 |
| 22 | 291 | 7.59 | 2.21 | 0.013 | 5.71 | 98.0 |
| 24 | 289 | 7.59 | 2.19 | 0.013 | 5.75 | 97.3 |
| 26 | 291 | 7.59 | 2.21 | 0.013 | 5.71 | 98.0 |
| 28 | 292 | 7.59 | 2.22 | 0.013 | 5.69 | 98.3 |
| 30 | 290 | 7.59 | 2.20 | 0.013 | 5.73 | 97.6 |

Chlorine dioxide production using chlorite and hydrochloric acid was tested in a larger scale reactor. The reactor included a ⅜" inch Tee connected to about 91.4 cm of ⅜" inch tubing. Table 8 compares the theoretical production rate with the actual production rate.

TABLE 8

Chlorine dioxide conversion efficiency in large scale reactor.

| Theoretical $ClO_2$ Production Rate (lb/h) | Average Motive Water Flow Rate (gpm) | Average $ClO_2$ Concentration in Motive Water (ppm) | Actual $ClO_2$ Production Rate (lb/hr) | Average Conversion Efficiency (%) | Standard Deviation (%) |
| --- | --- | --- | --- | --- | --- |
| 0.2 | 1.48 | 258.8 | 0.192 | 96.1 | 21.0 |
| 2.0 | 4.87 | 807.8 | 1.970 | 98.4 | 12.0 |
| 4.0 | 6.00 | 1336.8 | 4.019 | 100.4 | 5.1 |

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the apparatuses and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a feed line" is intended to include "at least one feed line" or "one or more feed lines."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of producing chlorine dioxide, comprising:
   feeding a first solution comprising an acid through a first feed line into a mixing device;
   feeding a second solution comprising chlorite through a second feed line into the mixing device;
   mixing the first solution and the second solution in the mixing device to form a reaction mixture, wherein the mixing device is in fluid communication with a reactor;
   feeding the reaction mixture into the reactor;
   reacting the acid and the chlorite in the reactor, wherein the reactor comprises a proximal portion in fluid communication with the mixing device and a distal portion in fluid communication with a motive water line, wherein the mixing device, the reactor, a portion of the first feed line, and a portion of the second feed line are positioned within the motive water line; and
   mixing chlorine dioxide with motive water in the motive water line at the distal portion of the reactor, wherein the motive water line is a double containment pipe having an inner channel separated from an outer channel, wherein the reactor is disposed within the inner channel and the motive water flows through the inner and outer channel and the chlorine dioxide mixes with the motive water flowing through the inner channel and outer channel at the distal portion of the reactor.

2. The method of claim 1, wherein the acid is hydrochloric acid, phosphoric acid, sulfuric acid, hypochlorous acid, or any combination thereof.

3. A method of treating process water, comprising: producing chlorine dioxide according to claim 1; and injecting the mixture of the chlorine dioxide and the motive water into the process water.

4. The method of claim 1, further comprising cooling the mixing device and the reactor with the motive water.

5. The method of claim 1, wherein the reactor comprises a coiled configuration having a coil plane angle of about 1 degree to about 60 degrees.

6. The method of claim 1, wherein the first feed line and the second feed line are opposite to and directed against each other.

7. The method of claim 1, wherein the reactor is operated at a pressure about equal to or greater than atmospheric pressure.

8. The method of claim 1, wherein the reaction mixture has a residence time in the reactor of at least about 0.1 minute, and a precursor velocity is at least about 25 cm/min, wherein the precursor velocity is a velocity of the first and second solutions.

9. The method of claim 1, further comprising producing the chlorine dioxide at a rate ranging from about 0.001 lb/hour to about 20 lb/hour.

10. The method of claim 1, further comprising operating the reactor at a temperature ranging from about 2° C. to about 80° C.

11. The method of claim 3, wherein injecting the mixture of chlorine dioxide and motive water into the process water of a cooling tower.

12. A method of producing chlorine dioxide, comprising:
    feeding a first solution comprising an acid through a first feed line into a mixing device;
    feeding a second solution comprising chlorite through a second feed line into the mixing device;
    mixing the first solution and the second solution in the mixing device to form a reaction mixture, wherein the mixing device is in fluid communication with a reactor;
    feeding the reaction mixture into the reactor;
    reacting the acid and the chlorite in the reactor, wherein the reactor comprises a proximal portion in fluid communication with the mixing device and a distal portion in fluid communication with a motive water line, wherein the mixing device, the reactor, a portion of the first feed line, and a portion of the second feed line are positioned within the motive water line; and
    mixing chlorine dioxide with motive water in the motive water line at the distal portion of the reactor,
    wherein the acid is phosphoric acid, sulfuric acid, hypochlorous acid, or any combination thereof,
    wherein the motive water line is a double containment pipe having an inner channel separated from an outer channel, wherein the reactor is disposed within the inner channel and the motive water flows through the inner and outer channel and the chlorine dioxide mixes with the motive water flowing through the inner channel and outer channel at the distal portion of the reactor.

13. The method of claim 1, wherein the reactor has an inner diameter ranging from about 0.1 inches to about 4 inches.

\* \* \* \* \*

UNITED STATES PATENT AND TRADEMARK OFFICE
CERTIFICATE OF CORRECTION

| | | |
|---|---|---|
| PATENT NO. | : 11,130,677 B2 | Page 1 of 1 |
| APPLICATION NO. | : 15/928435 | |
| DATED | : September 28, 2021 | |
| INVENTOR(S) | : Kun Xiong et al. | |

It is certified that error appears in the above-identified patent and that said Letters Patent is hereby corrected as shown below:

On the Title Page

Column 2, Lines 1-2, (57) Abstract, delete "chloride dioxide" and insert -- chlorine dioxide --.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*